(12) United States Patent
Hogan

(10) Patent No.: US 11,540,497 B2
(45) Date of Patent: Jan. 3, 2023

(54) FOLDABLE LOBSTER NET

(71) Applicant: Vincent George Hogan, Fort Lauderdale, FL (US)

(72) Inventor: Vincent George Hogan, Fort Lauderdale, FL (US)

(*) Notice: Subject to any disclaimer, the term of this patent is extended or adjusted under 35 U.S.C. 154(b) by 341 days.

(21) Appl. No.: 17/008,635

(22) Filed: Aug. 31, 2020

(65) Prior Publication Data
US 2021/0059231 A1    Mar. 4, 2021

Related U.S. Application Data

(60) Provisional application No. 62/893,790, filed on Aug. 29, 2019.

(51) Int. Cl.
*A01K 77/00* (2006.01)
*A01K 80/00* (2006.01)

(52) U.S. Cl.
CPC .............. *A01K 77/00* (2013.01); *A01K 80/00* (2013.01)

(58) Field of Classification Search
USPC ....................................... 43/11, 12
See application file for complete search history.

(56) References Cited

U.S. PATENT DOCUMENTS

| | | | | |
|---|---|---|---|---|
| 546,023 A * | 9/1895 | Meisselbach et al. | | |
| | | | | A01K 77/00 43/12 |
| 823,113 A * | 6/1906 | Reilly | ................... | A01K 77/00 43/12 |
| 959,555 A * | 5/1910 | Koberstein | ............ | A01K 77/00 43/12 |
| 996,234 A * | 6/1911 | Fritz | ...................... | A01K 77/00 43/12 |
| 1,240,787 A * | 9/1917 | Van Horn | ............... | A01K 77/00 43/12 |
| 1,366,145 A * | 1/1921 | Wolf | ...................... | A01K 77/00 43/12 |
| 1,420,396 A * | 6/1922 | Warren, Sr. | ............ | A01K 73/12 43/12 |
| 2,021,387 A * | 11/1935 | Saarela | ................... | A01K 77/00 43/12 |
| 2,457,922 A * | 1/1949 | Herman | ................. | A01K 77/00 43/12 |

(Continued)

FOREIGN PATENT DOCUMENTS

CA    2816068 A1 *  6/2014  ............ A01K 77/00
CN    207870143 U  *  9/2018

(Continued)

*Primary Examiner* — Darren Wark
(74) *Attorney, Agent, or Firm* — Mark C. Johnson; Johnson Dalal

(57) ABSTRACT

A foldable handheld net having a handle portion defining a first end of the lobster net, a net frame assembly with a first and second frame members forming at least a portion of the handle portion and each having magnets or another fastener disposed thereon, wherein the first and second frame members have a meshed net attached thereto and are operably configured to selectively rotate and selective couple with respect to one another and be retained in a folded position along a frame translation path with the magnets or fasteners. Additionally, the handle portion may have tickling stick selectively removably coupled thereto for detachment and use by the user.

8 Claims, 8 Drawing Sheets

(56) References Cited

U.S. PATENT DOCUMENTS

| | | | | |
|---|---|---|---|---|
| 2,486,163 A * | 10/1949 | Jennings | A01K 77/00 43/11 |
| 2,515,685 A * | 7/1950 | Ash | A01K 77/00 403/219 |
| 2,520,780 A * | 8/1950 | Pieron | A01K 77/00 43/105 |
| 2,539,563 A * | 1/1951 | Baloun | A01K 77/00 43/5 |
| 2,600,773 A * | 6/1952 | Hungerford | A01K 77/00 43/12 |
| 2,619,755 A * | 12/1952 | Henson | A01K 77/00 43/12 |
| 2,653,403 A * | 9/1953 | Oslund | A01K 77/00 43/79 |
| 2,683,321 A * | 7/1954 | Faber | A01K 77/00 403/328 |
| 2,724,920 A * | 11/1955 | Boehm | A01K 77/00 43/12 |
| 2,725,658 A * | 12/1955 | Wiederhold | A01K 77/00 43/12 |
| 2,765,535 A * | 10/1956 | Weber | A01K 77/00 43/25 |
| 2,971,284 A * | 2/1961 | Opel | A01K 74/00 43/69 |
| 3,004,362 A * | 10/1961 | Day | A01K 77/00 403/328 |
| 3,318,035 A * | 5/1967 | Hovland | A01K 77/00 D22/135 |
| 3,484,981 A * | 12/1969 | Gilmer | A01K 73/12 43/105 |
| 3,521,392 A * | 7/1970 | Brown | A01K 73/12 43/12 |
| 3,530,610 A * | 9/1970 | Bremer | A01K 77/00 43/11 |
| 3,670,444 A * | 6/1972 | Dieterich | A01K 77/00 43/12 |
| 3,715,829 A * | 2/1973 | Hamilton | A01K 77/00 43/12 |
| 4,021,956 A * | 5/1977 | Hogg | A01K 77/00 43/12 |
| 4,031,650 A * | 6/1977 | Popeil | A01K 77/00 43/12 |
| 4,263,864 A * | 4/1981 | Carter, Jr. | A01K 77/00 114/221 R |
| 4,492,052 A * | 1/1985 | Davis | A01K 77/00 43/12 |
| 4,774,783 A * | 10/1988 | Willard | A01K 77/00 43/12 |
| 4,776,129 A * | 10/1988 | Kelly | A01M 3/002 43/133 |
| 4,870,773 A * | 10/1989 | Schmucker | A01K 77/00 43/12 |
| 5,062,816 A * | 11/1991 | Berglund | B63H 16/04 416/74 |
| 5,276,989 A * | 1/1994 | Lumb | A01K 77/00 210/470 |
| 5,276,995 A * | 1/1994 | Johnson | A01K 69/06 43/7 |
| 5,339,556 A * | 8/1994 | Boehm | A01K 77/00 43/11 |
| 5,380,113 A * | 1/1995 | Boehm | A01K 77/00 16/319 |
| 5,501,026 A * | 3/1996 | Bryant | A01K 77/00 43/11 |
| 5,605,003 A * | 2/1997 | Krc | A01K 77/00 43/12 |
| 5,651,141 A * | 7/1997 | Schneider | A01K 77/00 224/103 |
| 5,822,908 A * | 10/1998 | Blanchard | A01K 77/00 43/7 |
| 5,941,011 A * | 8/1999 | Baker | A01K 77/00 16/366 |
| 6,058,642 A * | 5/2000 | Branneman | A01K 77/00 43/12 |
| 6,101,756 A * | 8/2000 | Baker | A01K 77/00 43/12 |
| 6,178,684 B1 * | 1/2001 | Nyakas | A01K 77/00 43/12 |
| 6,598,335 B2 * | 7/2003 | Akhtar | A01K 23/005 43/12 |
| 6,681,515 B2 * | 1/2004 | Grill | A01K 77/00 43/11 |
| 6,705,039 B1 * | 3/2004 | Campbell | A01K 77/00 43/7 |
| 7,322,146 B1 * | 1/2008 | Baldwin | A01K 77/00 24/303 |
| 7,624,530 B2 * | 12/2009 | Resch | A01K 77/00 43/17.5 |
| 7,730,657 B1 * | 6/2010 | Gierucki | A01K 77/00 294/111 |
| 7,918,049 B2 * | 4/2011 | Daley, III | A01K 77/00 43/11 |
| 8,261,482 B1 * | 9/2012 | Buchanan | A01K 77/00 206/234 |
| 8,356,443 B1 * | 1/2013 | Hume | A01K 77/00 43/11 |
| 8,490,318 B2 * | 7/2013 | Smith | A01K 77/00 43/11 |
| 8,806,801 B2 * | 8/2014 | Steffens | A01K 77/00 43/11 |
| 8,857,098 B2 * | 10/2014 | Marks | A01K 77/00 43/12 |
| 10,595,518 B1 * | 3/2020 | Patterson | A01K 74/00 |
| 11,191,257 B1 * | 12/2021 | Gibson | A01K 97/00 |
| 11,357,220 B2 * | 6/2022 | Xu | A01K 75/02 |
| 2002/0011017 A1 * | 1/2002 | Blaschke | A01K 77/00 43/12 |
| 2004/0000085 A1 * | 1/2004 | Grill | A01K 77/00 43/11 |
| 2004/0040196 A1 * | 3/2004 | Schwartz | G01B 3/1084 33/768 |
| 2007/0214702 A1 * | 9/2007 | Christiansen | A01K 77/00 43/11 |
| 2009/0100739 A1 * | 4/2009 | Resch | A01K 77/00 43/11 |
| 2010/0132242 A1 * | 6/2010 | Emter, Jr. | A01K 77/00 43/11 |
| 2010/0200308 A1 * | 8/2010 | Pigott | G01G 19/60 177/245 |
| 2012/0036758 A1 * | 2/2012 | Steffens | A01K 77/00 43/11 |
| 2012/0091174 A1 * | 4/2012 | Breeze | A45F 5/021 224/222 |
| 2013/0091755 A1 * | 4/2013 | Marks | A01K 77/00 43/11 |
| 2013/0097913 A1 * | 4/2013 | Hume | A01K 77/00 43/11 |
| 2014/0157650 A1 * | 6/2014 | Blood | A01K 77/00 135/66 |
| 2015/0121744 A1 * | 5/2015 | Coppola | A01M 3/002 43/110 |
| 2018/0014515 A1 * | 1/2018 | Waters | A01K 97/00 |
| 2019/0053475 A1 * | 2/2019 | Xu | A01K 74/00 |
| 2020/0296943 A1 * | 9/2020 | Mast | A01K 77/00 |
| 2020/0359611 A1 * | 11/2020 | Xu | A01K 75/02 |
| 2022/0201995 A1 * | 6/2022 | Slusher | A01K 75/02 |
| 2022/0201996 A1 * | 6/2022 | Slusher | A01K 75/00 |

FOREIGN PATENT DOCUMENTS

| | | | |
|---|---|---|---|
| CN | 209300028 U * | 8/2019 | |
| CN | 210329015 U * | 4/2020 | |
| CN | 210406772 U * | 4/2020 | |
| CN | 210538304 U * | 5/2020 | |
| EP | 0522802 A1 * | 1/1993 | |
| GB | 2433186 A * | 6/2007 | A01K 77/00 |
| JP | 2006149357 A * | 6/2006 | |
| KR | 20020036653 A * | 5/2002 | |

(56) References Cited

FOREIGN PATENT DOCUMENTS

| KR | 20110007669 U | * | 8/2011 | |
|---|---|---|---|---|
| KR | 20120024226 A | * | 3/2012 | |
| WO | WO-9858535 A1 | * | 12/1998 | ........... A01K 61/007 |
| WO | WO-0065958 A1 | * | 11/2000 | ............. A01K 77/00 |

* cited by examiner

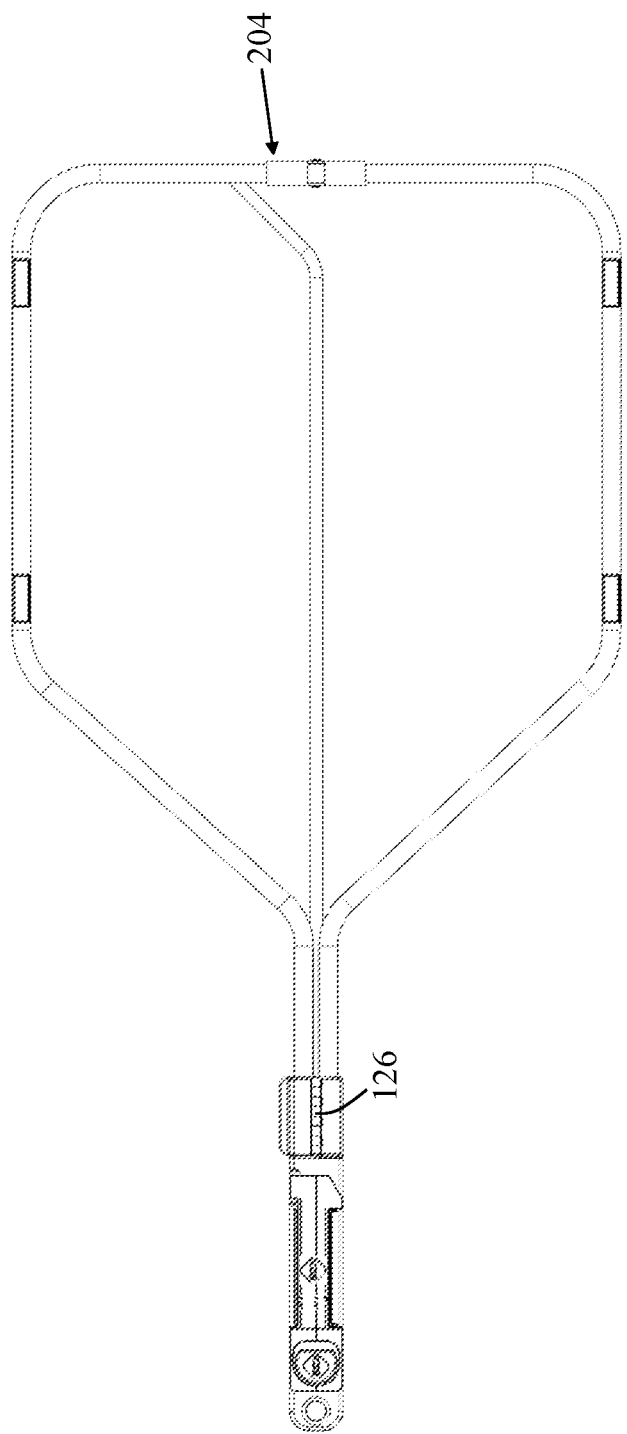
FIG. 4
FIG. 5

FOLDABLE LOBSTER NET

FIELD OF THE INVENTION

The present invention relates to handheld nets, and, more particularly, relates to handheld nets that are foldable and that may include a tickling stick selectively removably couplable thereto

BACKGROUND OF THE INVENTION

Whether for sport, enjoyment, and/or commercial reasons, many users utilize handheld nets in water for capturing and retaining a fish, crustaceans, and other aquatic life. Many of these known nets are relatively expensive and often times cumbersome to transport around when not in use. Furthermore, many of these known nets are prone to breaking and/or being damaged when not in use. To facilitate in locating and capturing crustaceans, namely lobsters, many users also utilize what is known as a "tickling stick" or "tickler," which is a substantially rigid and slender stick, often with a curved or angled end, that enables a user to move object(s) around in order to draw out a lobster for capturing. As such, the known nets do not enable users to effectively and efficiently carry around (both while the net is in use or otherwise) the tickling stick.

Some known nets are foldable, such as the nets disclosed in U.S. Pat. Nos. 8,857,098 and 4,492,052, but these nets fail to teach effective, quick, and efficient use and storage of the net and other components utilized by users therewith, much less effective and efficient coupling of a tickling stick. For example, the rotatable frame of these known nets is prone to dislodgement and breaking when the net or frame is subjected to weight that exceeds approximately 2-4 lbs (or approximately 2-3 lobsters).

Therefore, a need exists to overcome the problems with the prior art as discussed above.

SUMMARY OF THE INVENTION

The invention provides a foldable lobster net that overcomes the hereinafore-mentioned disadvantages of the heretofore-known devices and methods of this general type and that effectively, efficiently, and safely facilities in retaining aquatic life, particularly crustaceans like lobster, while also being configured for quick and space-efficient storage of the net and a tickling stick.

With the foregoing and other objects in view, there is provided, in accordance with the invention, a foldable handheld net having a handle portion defining a first end of the lobster net, having a second end, and defining a handle axis oriented in a longitudinal orientation. Also, the assembly includes a net frame assembly having a first frame member of a slender configuration, extending in a longitudinal direction and in a direction laterally away from the handle axis, forming at least a portion of the handle portion, having a top surface with at least one magnet with a first polarity disposed thereon, and defining a second end of the lobster net opposing the first end of the lobster net, and a second frame member of a slender configuration, extending in the longitudinal direction and in a direction laterally away from the handle axis, defining the second end of the lobster net, forming at least a portion of the handle portion, having a top surface with at least one magnet disposed thereon with a second polarity opposite to the first polarity of the at least one magnet disposed on the top surface of the first frame member, selectively rotatably coupled to the first frame member about a hinge disposed at the second end of the lobster net, and operably configured to rotate toward and away from the top surface of the first frame member about the hinge along a frame translation path. The frame translation path has a closed position with the first and second frame portions disposed in an overlapping configuration and retained together by one or more magnet(s), disposed on the top surfaces of the first and second frame members, respectively. The frame translation path also has an open position with the top surfaces of the first and second frame members defining a perimeter edge defining a frame opening. Additionally, the assembly includes a mesh net coupled to the assembly around the first and second frame members and defining a net cavity spatially coupled to the frame opening when the frame translation path is in the open position.

In accordance with another feature of the present invention, the handle portion is of a slender configuration.

In accordance with another feature, an embodiment of the present invention includes the at least one magnet disposed on the top surface of the first frame member and the at least one magnet disposed on the top surface of the second frame member are of a substantially planar shape.

In accordance with another feature, an embodiment of the present invention also includes a tickling stick with a handle selectively removably coupled to a bottom surface of the handle portion and stick member of a slender configuration and extending from the handle portion to the second end of the lobster net.

In accordance with another feature of the present invention, the tickling stick selectively retained to the bottom surface of the handle portion with a snap fit configuration. Additionally, the second frame member is selectively rotatably coupled to the first frame member about a secondary hinge disposed at the second end of the handle portion and disposed at a top surface of the handle portion.

In accordance with another feature, an embodiment of the present invention also includes a tickling stick with a handle selectively removably coupled to a bottom surface of the handle portion and stick member of a slender configuration and extending from the handle portion to the second end of the lobster net, the bottom surface of the handle portion opposing the top surface of the handle portion.

Although the invention is illustrated and described herein as embodied in a foldable lobster net, it is, nevertheless, not intended to be limited to the details shown because various modifications and structural changes may be made therein without departing from the spirit of the invention and within the scope and range of equivalents of the claims. Additionally, well-known elements of exemplary embodiments of the invention will not be described in detail or will be omitted so as not to obscure the relevant details of the invention.

Other features that are considered as characteristic for the invention are set forth in the appended claims. As required, detailed embodiments of the present invention are disclosed herein; however, it is to be understood that the disclosed embodiments are merely exemplary of the invention, which can be embodied in various forms. Therefore, specific structural and functional details disclosed herein are not to be interpreted as limiting, but merely as a basis for the claims and as a representative basis for teaching one of ordinary skill in the art to variously employ the present invention in virtually any appropriately detailed structure. Further, the terms and phrases used herein are not intended to be limiting; but rather, to provide an understandable description of the invention. While the specification concludes with claims defining the features of the invention that are regarded as novel, it is believed that the invention will be better understood from a consideration of the following description in conjunction with the drawing figures, in which like reference numerals are carried forward. The figures of the drawings are not drawn to scale.

Before the present invention is disclosed and described, it is to be understood that the terminology used herein is for the purpose of describing particular embodiments only and is not intended to be limiting. The terms "a" or "an," as used herein, are defined as one or more than one. The term "plurality," as used herein, is defined as two or more than two. The term "another," as used herein, is defined as at least a second or more. The terms "including" and/or "having," as used herein, are defined as comprising (i.e., open language). The term "coupled," as used herein, is defined as connected, although not necessarily directly, and not necessarily mechanically. The term "providing" is defined herein in its broadest sense, e.g., bringing/coming into physical existence, making available, and/or supplying to someone or something, in whole or in multiple parts at once or over a period of time. Also, for purposes of description herein, the terms "upper", "lower", "left," "rear," "right," "front," "vertical," "horizontal," and derivatives thereof relate to the invention as oriented in the figures and is not to be construed as limiting any feature to be a particular orientation, as said orientation may be changed based on the user's perspective of the device. Furthermore, there is no intention to be bound by any expressed or implied theory presented in the preceding technical field, background, brief summary or the following detailed description.

As used herein, the terms "about" or "approximately" apply to all numeric values, whether or not explicitly indicated. These terms generally refer to a range of numbers that one of skill in the art would consider equivalent to the recited values (i.e., having the same function or result). In many instances these terms may include numbers that are rounded to the nearest significant figure. In this document, the term "longitudinal" should be understood to mean in a direction corresponding to an elongated direction of the handle of the foldable net, wherein "transverse" or "lateral" should be understood to mean a direction corresponding to a direction opposite the longitudinal direction.

BRIEF DESCRIPTION OF THE DRAWINGS

The accompanying figures, where like reference numerals refer to identical or functionally similar elements throughout the separate views and which together with the detailed description below are incorporated in and form part of the specification, serve to further illustrate various embodiments and explain various principles and advantages all in accordance with the present invention.

FIG. 4 is a top plan view of the foldable handheld net in FIG. 2;

FIG. 5 is an elevational right-side view of the foldable handheld net in FIG. 2;

DETAILED DESCRIPTION

Figure 1:
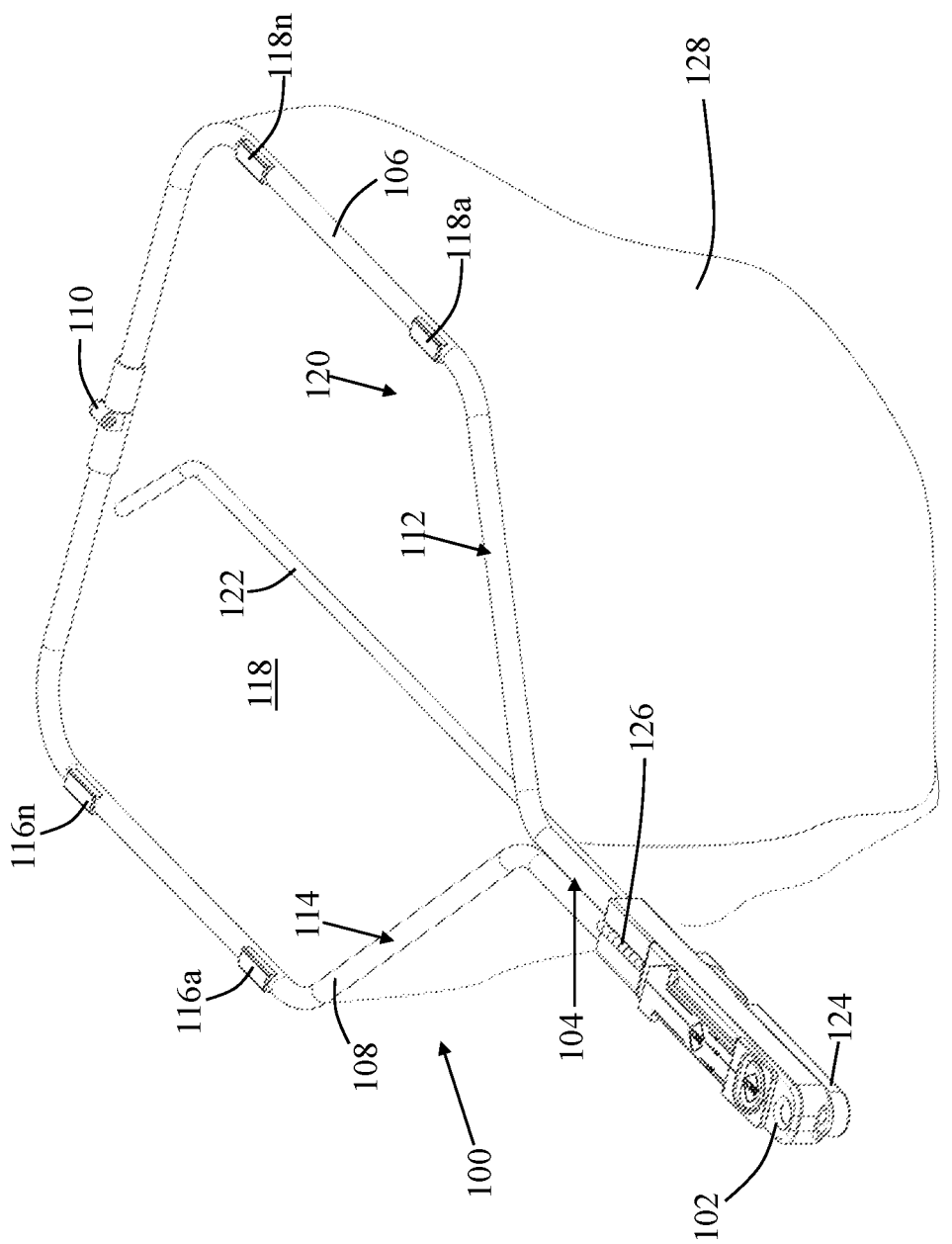
FIG. 1 is a perspective view of a foldable handheld net in accordance with one embodiment of the present invention.

While the specification concludes with claims defining the features of the invention that are regarded as novel, it is believed that the invention will be better understood from a consideration of the following description in conjunction with the drawing figures, in which like reference numerals are carried forward. It is to be understood that the disclosed embodiments are merely exemplary of the invention, which can be embodied in various forms.

The present invention provides a novel and efficient foldable lobster net. Referring now to FIG. 1, one embodiment of the present invention is shown in a perspective view. FIG. 1, along with the other figures depicted herein, shows several advantageous features of the present invention, but, as will be described below, the invention can be provided in several shapes, sizes, combinations of features and components, and varying numbers and functions of the components. The first example of a handheld foldable net 100, as shown in FIG. 1, includes a handle portion 102, a net frame assembly 104, and meshed net 128 coupled to the net frame assembly 104, namely the first and second frame members 106, 108 of the net frame assembly 104.

Figure 2:
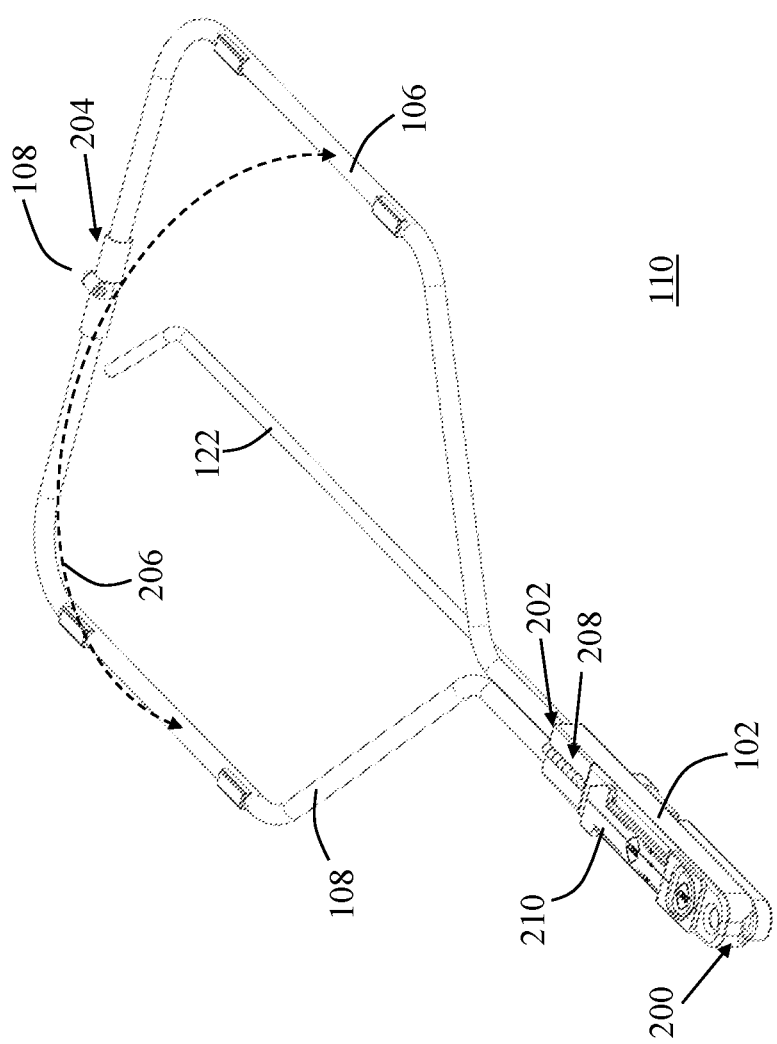
FIG. 2 is a perspective fragmentary view of the foldable handheld net with the net removed in accordance with one embodiment of the present invention.
Figure 3:
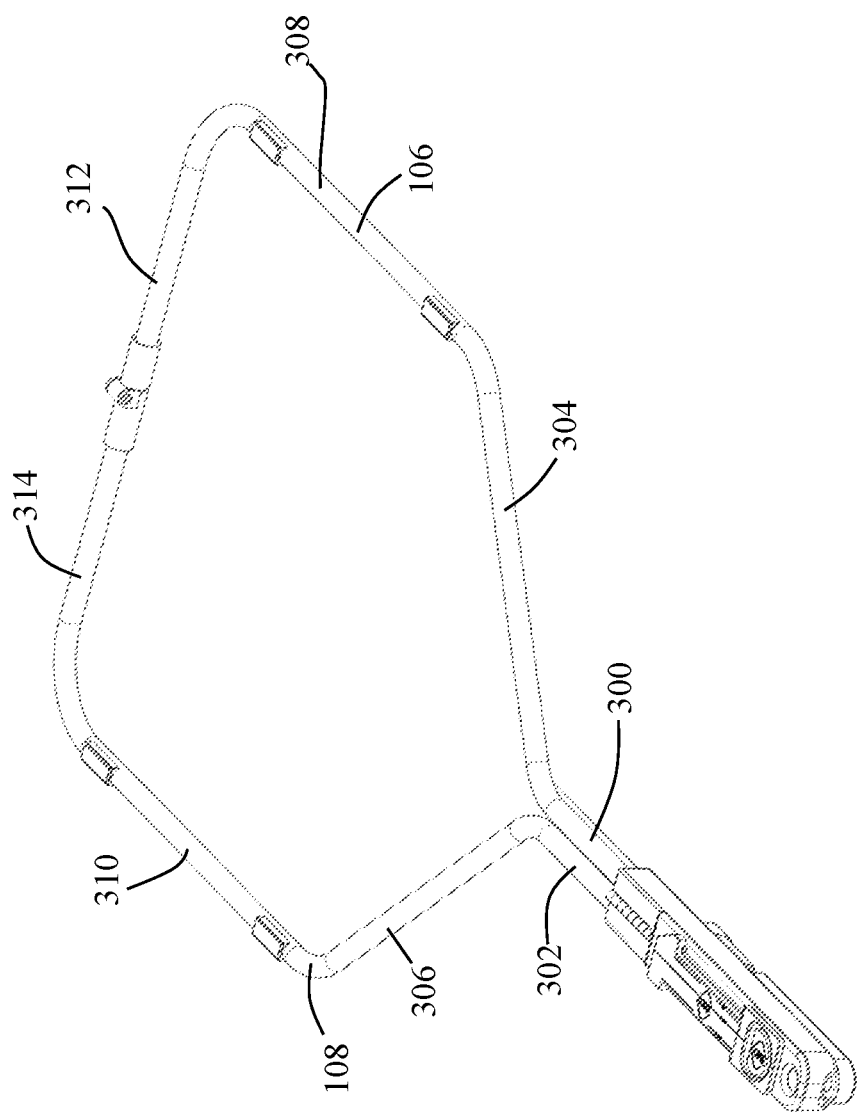
FIG. 3 is a perspective fragmentary view of the foldable handheld net with the net and tickling stick removed in accordance with one embodiment of the present invention.
Figure 6:
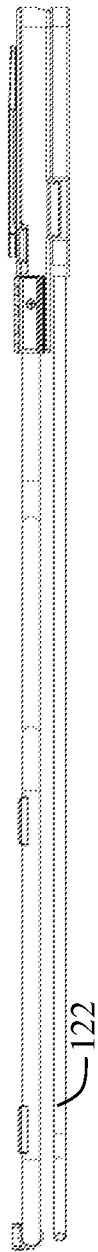
FIG. 6 is an elevational left-side view of the foldable handheld net in FIG. 2.
Figure 7:
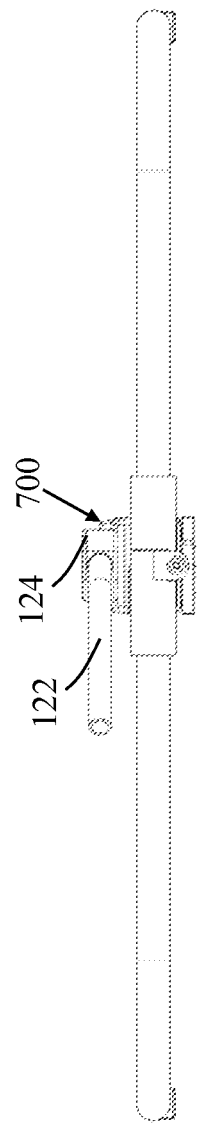
FIG. 7 is an elevational front view of the foldable handheld net in FIG. 2.

With reference to FIGS. 1-3, the handle portion 102 can been defining a first end 200, or terminal end, of the lobster net 100, along with a second end 202, and can be seen defining a handle axis 300 oriented in a longitudinal orientation. The handle portion is preferably of a slender configuration, or a length separating the ends 200, 202 that is longer than the average or uniform diameter of thickness of the handle portion 102. Beneficially, the handle portion 102 may have a tickling stick 122 selectively removably coupled to a bottom surface (best seen in FIG. 7) of the handle portion 102 with a magnetic coupling configuration (i.e., with two magnets of opposite polarity), a snap-fit coupling configuration (as seen in the figures), or other coupling configuration. The handle portion 102 preferably has a rubber grip portion enabling comfortable and effective grasping by the user.

The handle portion 102 may also include a first end 200, a second end 202 opposing the first end of the handle portion, and a handle length of approximately 3-8 inches separating the first and second ends 200, 202 of the handle portion 102. The top surface 208 of the handle portion 102 may include a measuring tool 210 with a bottle opener portion that may also serve as a means to couple the tool 210 to the top surface 208 of the handle portion 102. The measuring tool 210 may include a plurality of measuring indicia corresponding to conventionally known units of measurement, e.g., inches, centimeters, etc. The measuring tool 210 may also include one or more magnets disposed thereon for selectively coupling and retaining the tool 210 to the top surface 208 of the handle portion 102 (which will include a magnetic material of an opposing polarity). The bottom surface 700 of the handle portion 102 may include a portion operably configured to couple and/or retain the tickling stick 122. Specifically, the handle 124 of the tickling stick 122 will be shaped and sized to frictionally engage with the bottom surface 700 of the handle portion 102. In other embodiments, the tickle stick 122 may also include one or more magnets disposed thereon for selectively coupling and retaining the tickling stick 122 to the bottom surface 700 of the handle portion 102 (which will include a magnetic material of an opposing polarity) to enable effective coupling of the first and second frame members 106, 108 when in the closed position. Those of skill in the art will appreciate that the measuring tool 210 and tickling stick 122 may also be configured to selectively couple and uncouple with the bottom surface 700 and top surface 208, respectively. Additionally, the tickling stick 122 can be said to have a handle 124 selectively removably coupled to a bottom surface 700 of the handle portion 102 and stick member 400 of a slender configuration and extending from the handle portion 102 to the second end 204 of the lobster net 100. The tickling stick 122 may be selectively retained to the bottom surface 700 of the handle portion 102 with a snap fit configuration.

The frame assembly 104 includes the first frame member 106 and the second frame member 108 having a slender configuration (as defined above) and that extend in a longitudinal direction and in a direction laterally away from the handle axis 300. The second frame member 108 may also be selectively rotatably coupled to the first frame member 106 about a secondary hinge 126 disposed at the second end 202 of the handle portion 102 and disposed at a top surface 208 of the handle portion 102.

Preferably, the first and second frame members 106, 108 include (with reference to FIG. 3) a handle portion 300, 302, a first angled portion 304, 306 (disposed at an approximately 45° with respect to the orientation of the respective handle portions 300, 302), a straight portion 308, 310 (disposed at an approximately parallel with respect to the orientation of the respective handle portions 300, 302), and a coupling portion 312, 314 (disposed at an approximately 90° with respect to the orientation of the respective handle portions 300, 302).

The first and second frame members 106, 108 can be seen forming at least a portion of the handle portion 102. The first frame member 106 has a top surface 112 with one or more magnet(s) 118a-n with a first polarity disposed thereon, and defines a second end 204 of the lobster net 100 opposing the first end 200 of the lobster net 100. The second frame member 108 can be seen defining the second end 204 of the lobster net 100 as well and also includes a top surface 114 with one or more magnet(s) 116a-n disposed thereon with a second polarity opposite to the first polarity of the at least one magnet 118a-n disposed on the top surface 112 of the first frame member 106. Preferably, the magnets are of neodymium material or of another type permanent magnet material.

Figure 8:
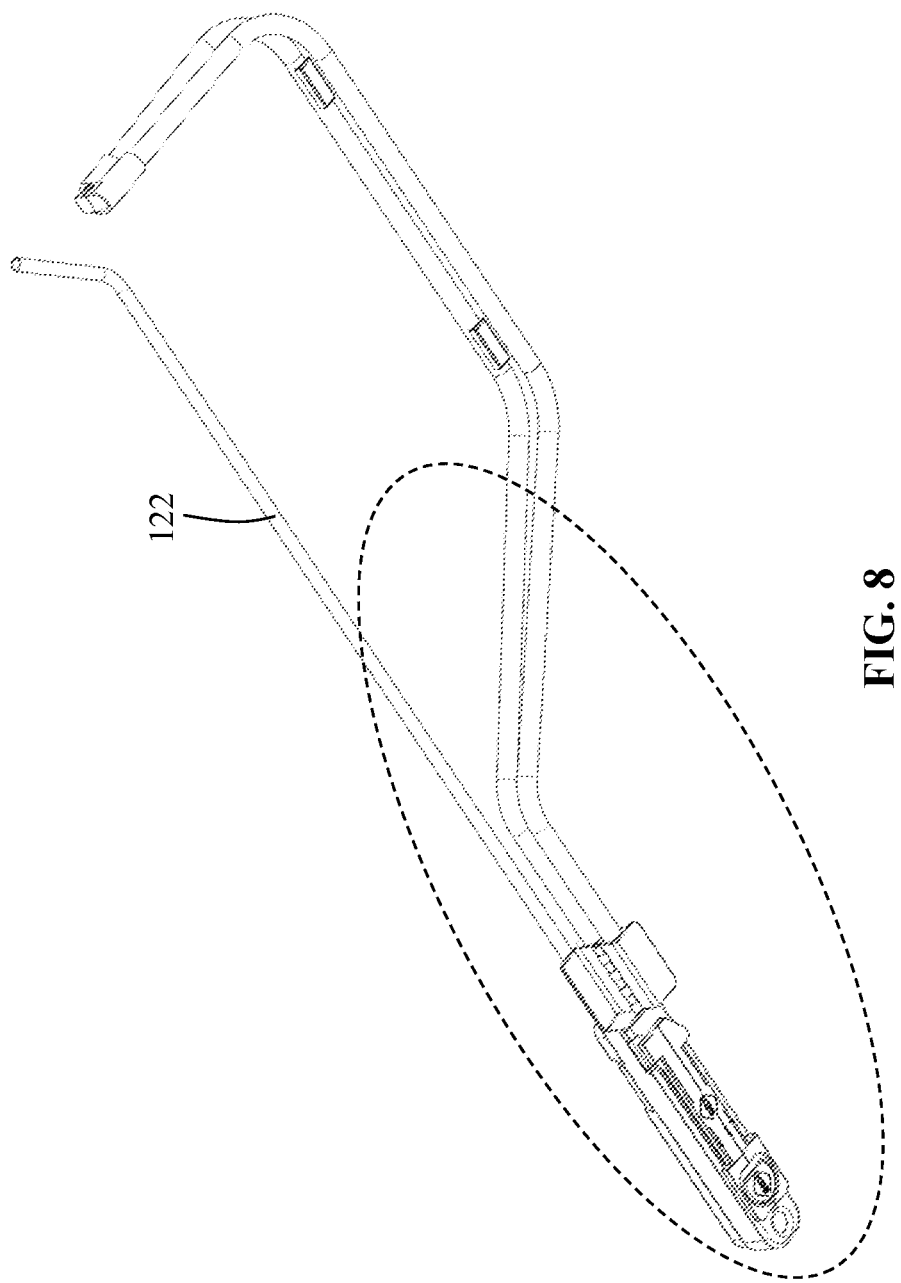
FIG. 8 is a perspective view of the foldable handheld net in FIG. 2 in a folded position in accordance with one embodiment of the present invention.
Figure 9:
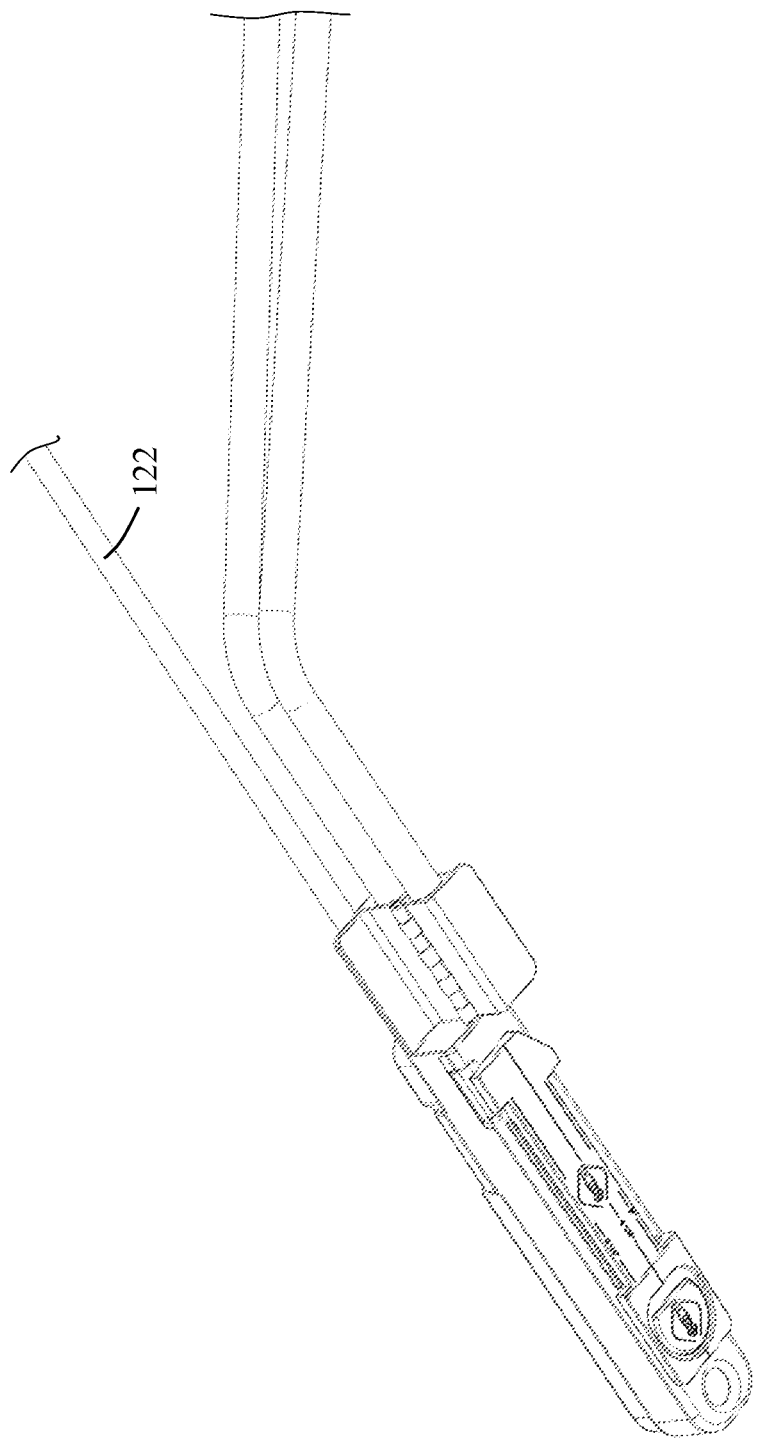
FIG. 9 is a close-up view of the handle portion of the foldable handheld net in FIG. 8.
Figure 10:
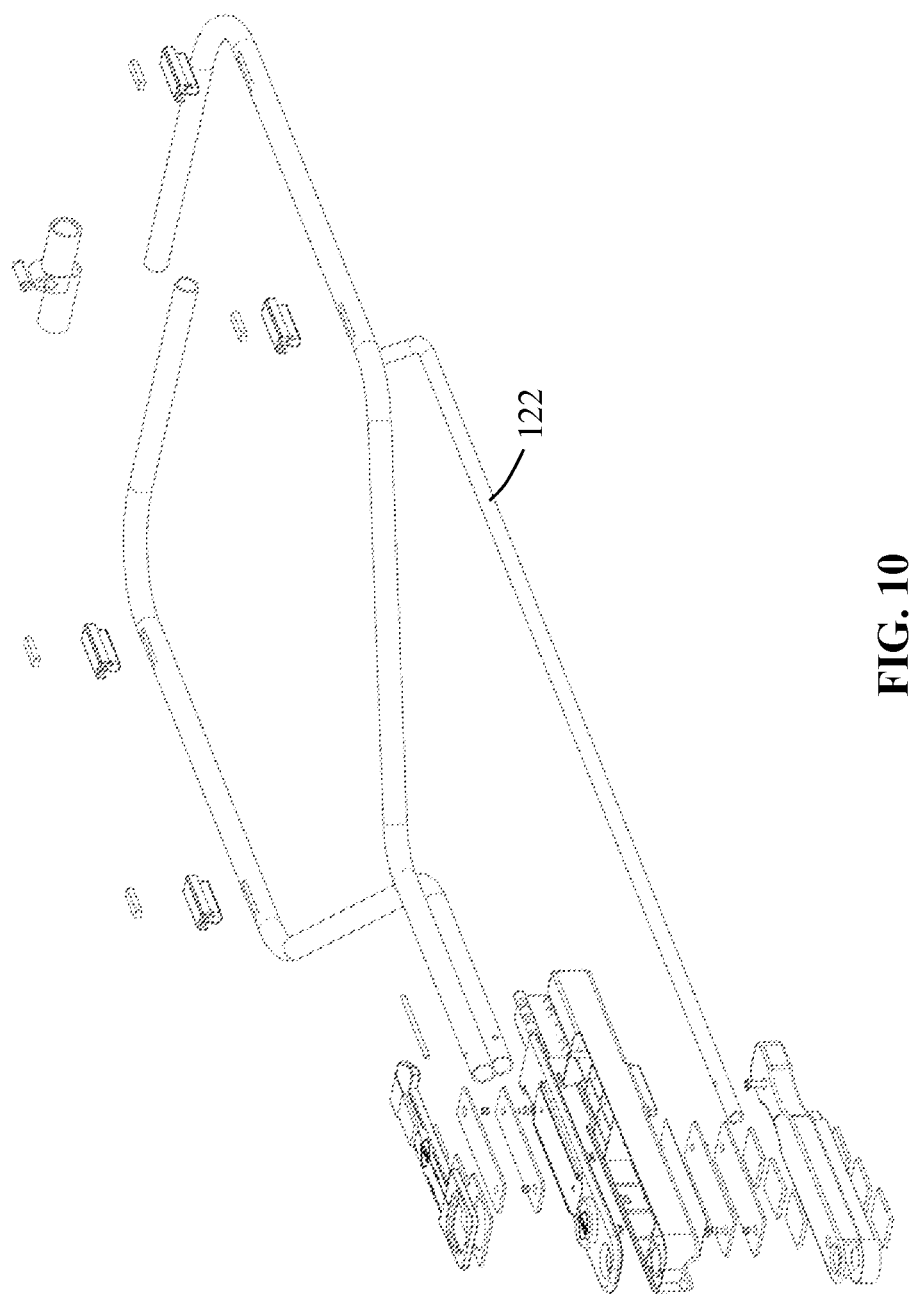
FIG. 10 is an exploded view of the foldable handheld net in FIG. 2.

The second frame member 108 is selectively rotatably coupled to the first frame member 106 about a hinge 110 disposed at the second end 200 of the lobster net 100, and is operably configured to rotate toward and away from the top surface 112 of the first frame member 106 about the hinge 110 along a frame translation path (exemplified with arrow 206) and having a closed position (as best shown in FIG. 8) with the first and second frame members 106, 108 disposed in an overlapping configuration and retained together by the at least one magnets 116a-n, 118a-n disposed on the top surfaces 112, 114 of the first and second frame members 106, 108, respectively. The second frame member 108 is also configured to have an open position (as best shown in FIG. 1) with the top surfaces 112, 114 of the first and second frame members 106, 108 defining a perimeter edge defining a frame opening 118. The at least one magnet 118a-n (where "n" represents any number greater than one) may be disposed on the top surface 112 of the first frame member 106 and the at least one magnet 116a-n disposed on the top surface 114 of the second frame member 108 are of a substantially planar shape to prevent the frame members 106, 108 from catching or rubbing on any aquatic debris or aquatic objects.

As discussed above, the mesh net 128 is coupled to the assembly 104 around the first and second frame members 106, 108 and defining a net cavity 120 spatially coupled to the frame opening 118 when the frame translation path is in the open position.

In one embodiment, the first and second frame portions 106, 108 of a tubular shape with top surfaces 112, 114 and bottom surfaces opposing the top surfaces 112, 114, wherein the top surfaces have one or more magnet(s) 118a-n, 116a-n disposed thereon. As such, a user is able to effectively and efficiently rotate at least one of the frame portions 106, 108 (e.g., using a tab or flange protruding from and end of the frame portion(s)) until it reaches the opposing magnet on the other frame portion and is retained thereto using said magnet. In other embodiments, another fastener may be utilized to engage opposing frame portions, e.g., a male/female coupling configuration.

The first and second frame portions 106, 108 can also be seen extending away from the second end of the handle portion and may form an L-shape that collectively defines a center aperture where the animals will be selectively inserted and removed therethrough. In one embodiment, the center aperture may have an area ranging from 1.5-3 ft$^2$. The first and second frame portions 106, 108 may also include a first end directly coupled to the handle, e.g., through a friction fitting configuration, with adhesive, etc. The first and second frame portions 106, 108 also include a second end terminating at a joint disposed at the second ends of the first and second frame portions. As such, the first and second frame portions are operably configured to rotate toward and away from one another about the joint and along a frame translation path. In the preferred embodiment, the frame translation path is circular, but in other embodiments, it may be linear or curvilinear.

The frame translation path can be seen having a closed position with the first and second frame portions disposed in an overlapping configuration and retained together by the at least one magnet disposed on top surface of the first and second frame portions. The material utilized for the magnets on the first and second frame portions 106, 108 should be operably configured to generate a magnetic pull force sufficient to resist a tensile force of approximately 1-5 lbf. The frame translation path can be seen having an open position with the first and second frame portions defining the center aperture. In preferred embodiments, one or both of the first and second frame portions are operably configured to be locked in the open position, e.g., using a friction fitting configuration. Said another way by example, the end of the second frame portion 108 may form a part of handle portion and may be rotatably coupled thereto using, for example, a hinge member. The end of the second frame portion and/or the handle portion 102 may include a notch or detent that resists rotational or translational movement of the second frame portion 108 unless sufficient force is applied, e.g., 1-51 bf, to the second frame portion 108.

The foldable net 100 may also include a mesh net selectively removably coupled to the first and second frame portions and configured to retain animals therein. In one embodiment, the net may be woven onto the first and second frame portions and preferably surrounds the perimeter defined by the first and second frame portions. In another embodiment, the mesh net may be selectively removably coupled to the frame portions using Velcro, e.g., Velcro strap(s), selectively placed around the perimeter of the frame portions.

Therefore, a unique and beneficial foldable net has been disclosed that includes the tools many individuals desire to catch and retain animals, namely lobster. Although a specific order of executing process steps has been described and depicted herein, the order of executing the steps may be changed relative to the order shown in certain embodiments. Also, two or more steps shown in succession may be executed concurrently or with partial concurrence in some embodiments. Certain steps may also be omitted for the sake of brevity. In some embodiments, some or all of the process steps included can be combined into a single process.

What is claimed is:

1. A foldable lobster net comprising:
a handle portion defining a first end of the lobster net, having a second end, and defining a handle axis oriented in a longitudinal orientation;
a net frame assembly having:
a first frame member of a slender configuration, extending in the longitudinal direction and in a first direction laterally away from the handle axis, forming at least a portion of the handle portion, having a top surface with at least one magnet with a first polarity disposed thereon, and defining a second end of the lobster net opposing the first end of the lobster net; and
a second frame member of a slender configuration, extending in the longitudinal direction and in a second direction laterally away from the handle axis, defining the second end of the lobster net, forming at least another portion of the handle portion, having a top surface with at least one magnet disposed thereon with a second polarity opposite to the first polarity of the at least one magnet disposed on the top surface of the first frame member, selectively rotatably coupled to the first frame member about a hinge disposed at the second end of the lobster net, and operably configured to rotate toward and away from the top surface of the first frame member about the hinge along a frame translation path having a closed position with the first and second frame portions disposed in an overlapping configuration and retained together by the at least one magnets, disposed on the top surfaces of the first and second frame members, respectively, and having an open position with the top surfaces of the first and second frame members defining a perimeter edge defining a frame opening; and
a mesh net coupled to the assembly around the first and second frame members and defining a net cavity spatially coupled to the frame opening when the frame translation path is in the open position.

2. The foldable lobster net according to claim 1, wherein:
the handle portion is of a slender configuration.

3. The foldable lobster net according to claim 1, wherein:
the first and second frame members are of a tubular shape.

4. The foldable lobster net according to claim 1, wherein:
the at least one magnet disposed on the top surface of the first frame member and the at least one magnet disposed on the top surface of the second frame member are of substantially planar shapes.

5. The foldable lobster net according to claim 1, further comprising:
a tickling stick with a handle selectively removably coupled to a bottom surface of the handle portion and a stick member of a slender configuration and extending from the handle portion to the second end of the lobster net.

6. The foldable lobster net according to claim 5, wherein:
the tickling stick being selectively removably coupled to the bottom surface of the handle portion with a snap fit configuration.

7. The foldable lobster net according to claim 1, wherein:
the second frame member is selectively rotatably coupled to the first frame member about a secondary hinge disposed at the second end of the handle portion and disposed at a top surface of the handle portion.

8. The foldable lobster net according to claim 7, further comprising:
a tickling stick with a handle selectively removably coupled to a bottom surface of the handle portion and a stick member of a slender configuration and extending from the handle portion to the second end of the lobster net, the bottom surface of the handle portion opposing the top surface of the handle portion.

* * * * *